(No Model.) 12 Sheets—Sheet 1.

G. E. HUNTER.
MECHANISM FOR TIMING AND ADJUSTING WATCH BALANCES AND HAIR SPRINGS.

No. 484,797. Patented Oct. 25, 1892.

Witnesses
Chas. J. Williamson.
Henry C. Hazard.

Inventor
George E. Hunter, by
Crindle and Russell, his Attys.

(No Model.) 12 Sheets—Sheet 2.
G. E. HUNTER.
MECHANISM FOR TIMING AND ADJUSTING WATCH BALANCES AND HAIR SPRINGS.
No. 484,797. Patented Oct. 25, 1892.
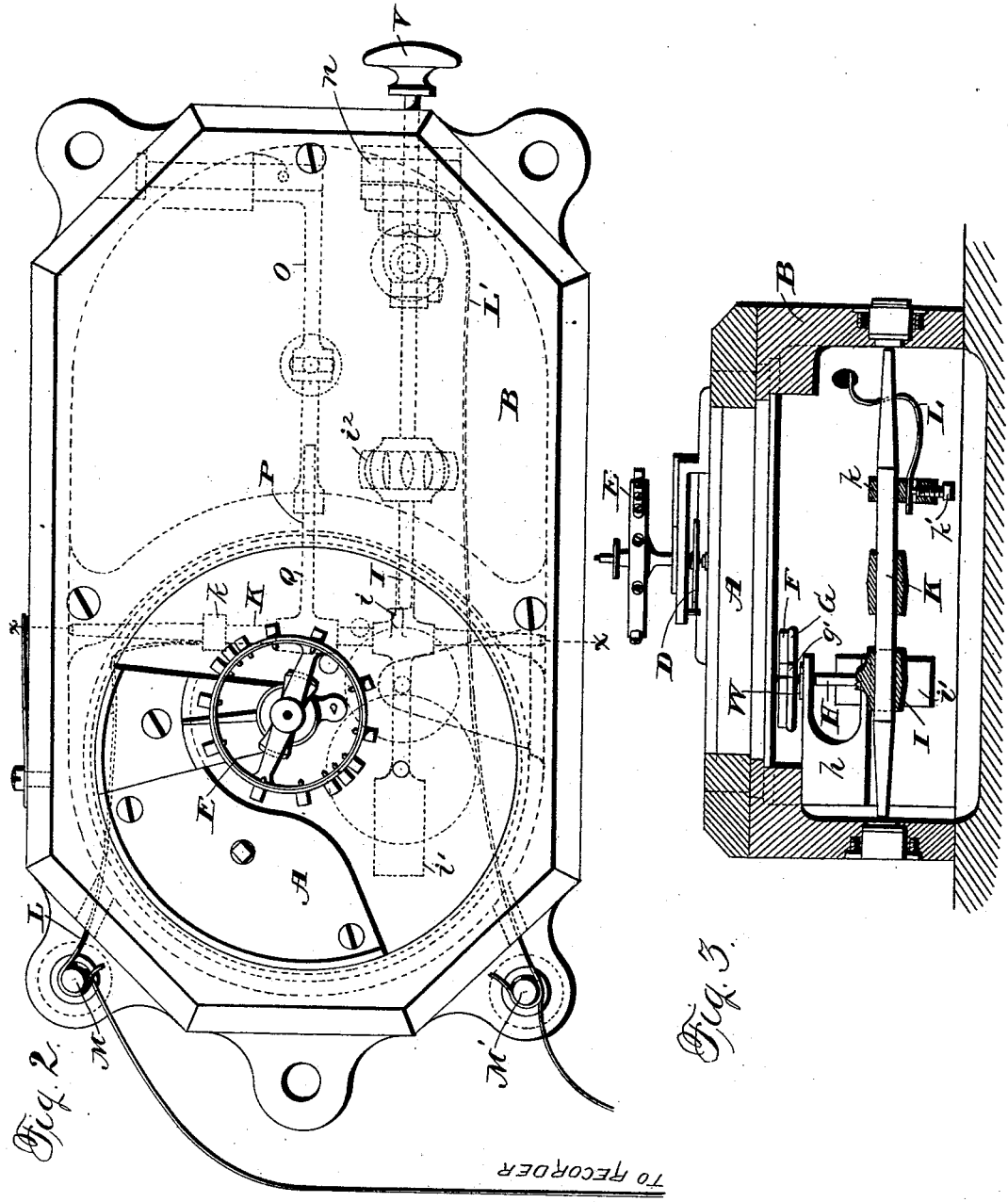
Witnesses
Chas. J. Williamson.
Henry C. Hazard.
Inventor
George E. Hunter, by
Dindle and Russell, his attys.

(No Model.) 12 Sheets—Sheet 3.
G. E. HUNTER.
MECHANISM FOR TIMING AND ADJUSTING WATCH BALANCES AND HAIR SPRINGS.
No. 484,797. Patented Oct. 25, 1892.
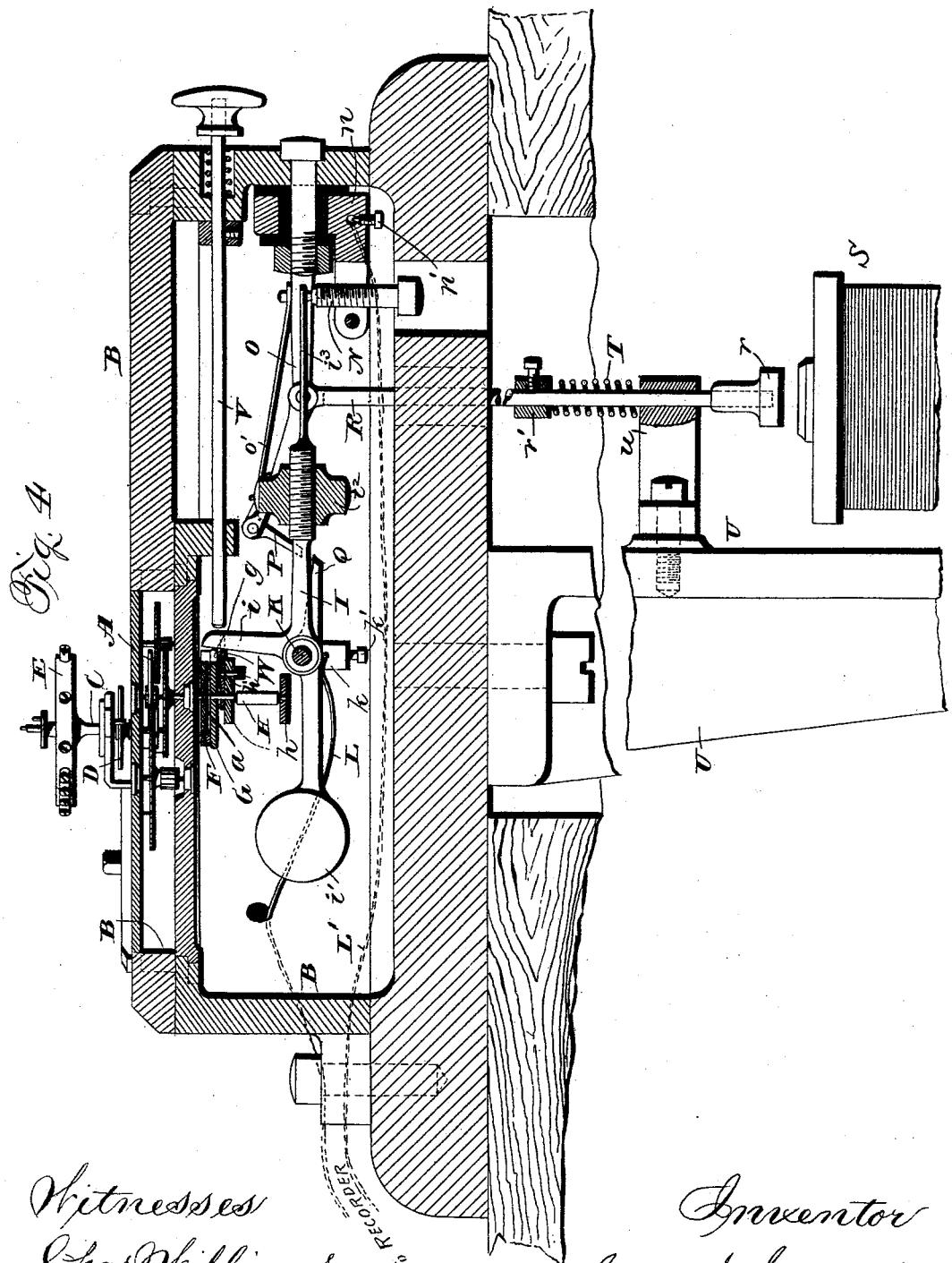
Witnesses
Chas. Williamson
Henry C. Hazard
Inventor
George E. Hunter, by
Dindle and Russell, his Att'ys (No Model.) 12 Sheets—Sheet 4.
G. E. HUNTER.
MECHANISM FOR TIMING AND ADJUSTING WATCH BALANCES
AND HAIR SPRINGS.
No. 484,797. Patented Oct. 25, 1892.
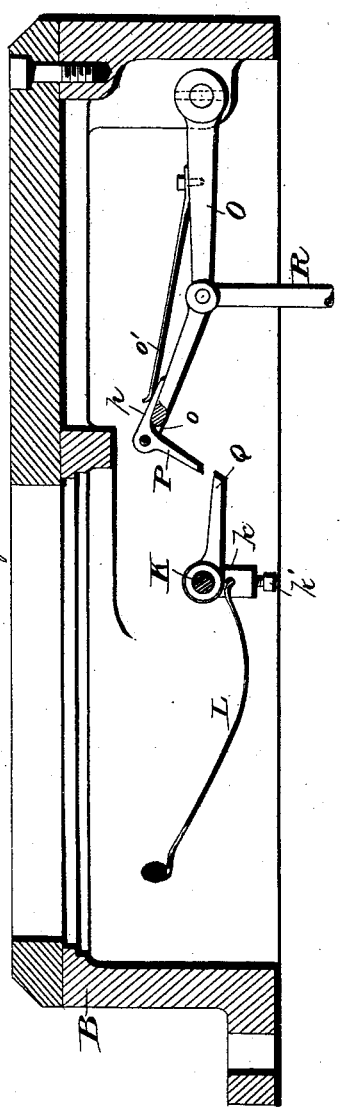
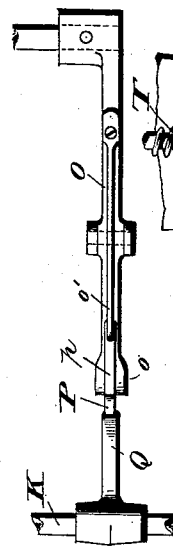
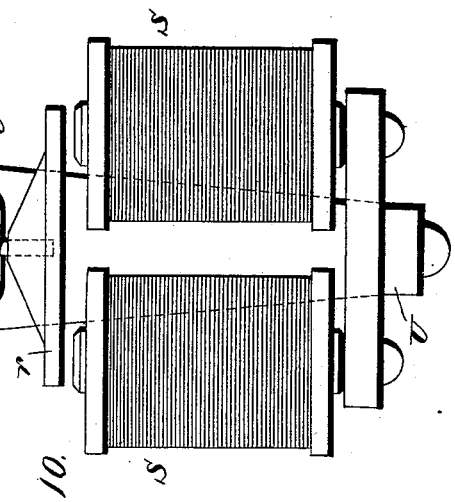
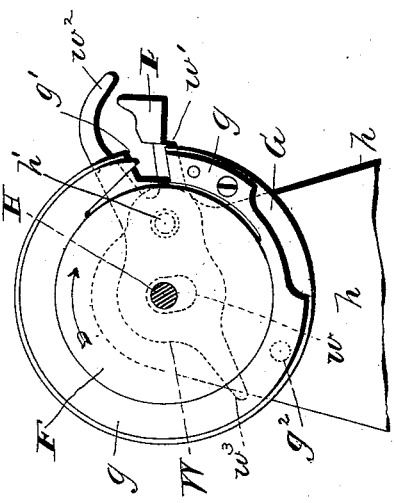

(No Model.) 12 Sheets—Sheet 5.

G. E. HUNTER.
MECHANISM FOR TIMING AND ADJUSTING WATCH BALANCES
AND HAIR SPRINGS.

No. 484,797. Patented Oct. 25, 1892.

Witnesses
Chas. J. Williamson.
Henry C. Hazard.

Inventor
George E. Hunter, by
Rindle and Russell, his Attys.

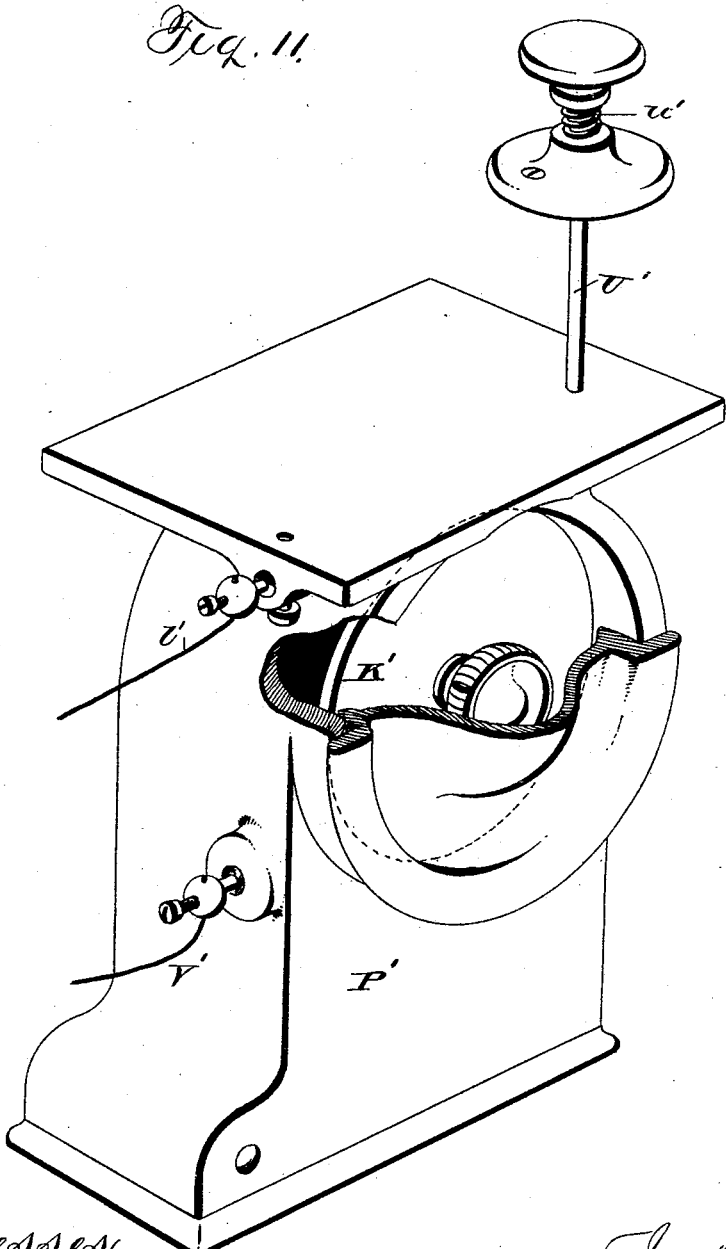

(No Model.) 12 Sheets—Sheet 7.
G. E. HUNTER.
MECHANISM FOR TIMING AND ADJUSTING WATCH BALANCES AND HAIR SPRINGS.
No. 484,797. Patented Oct. 25, 1892.
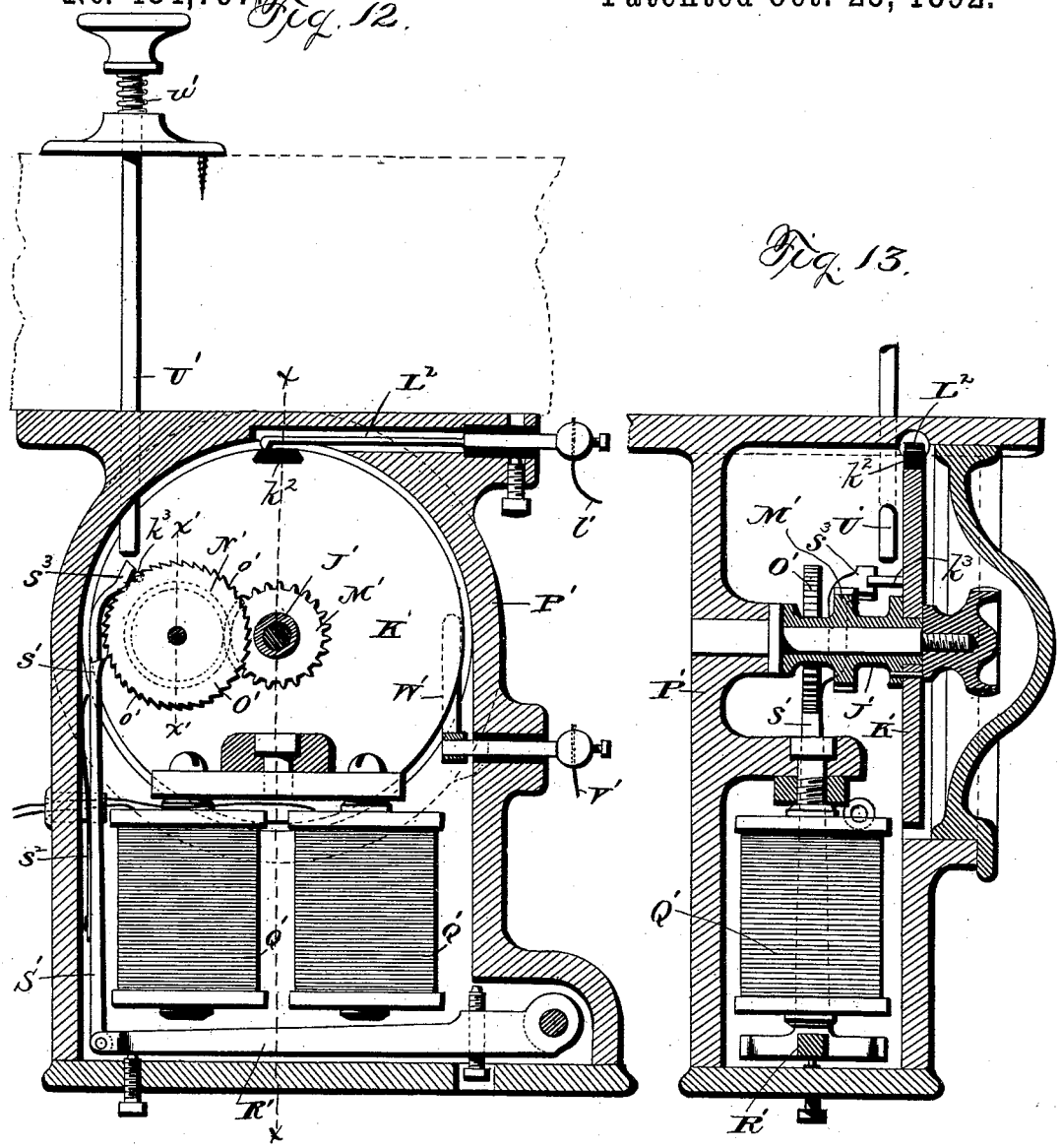
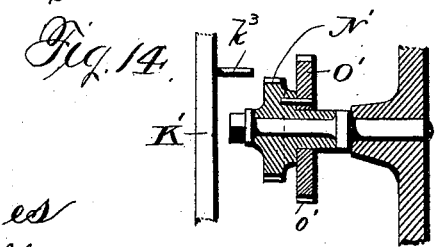
Witnesses
Chas. J. Williamson.
Henry C. Hazard.
Inventor
George E. Hunter, by
Prindle and Russell, his Attys.

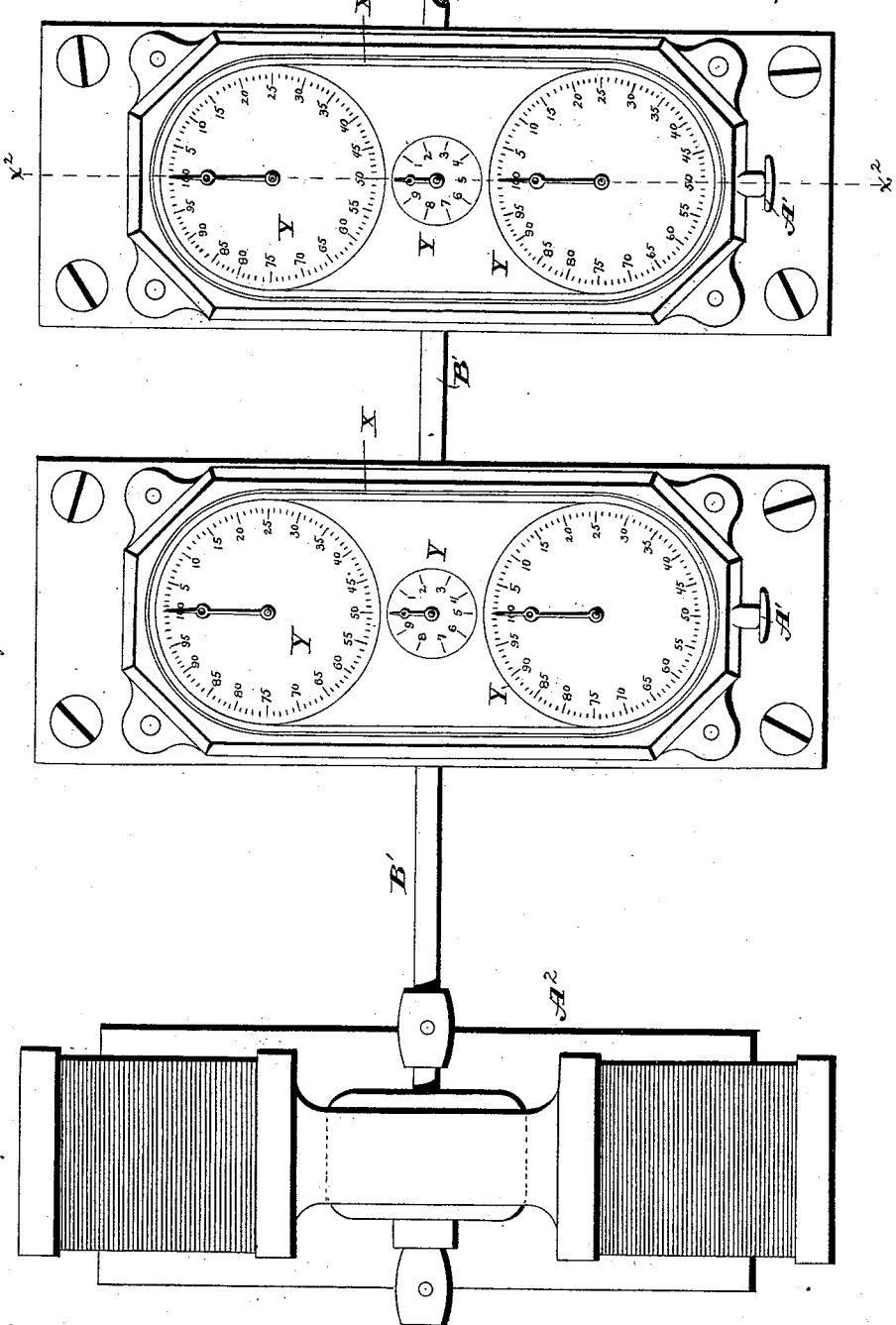

(No Model.)  12 Sheets—Sheet 9.

G. E. HUNTER.
MECHANISM FOR TIMING AND ADJUSTING WATCH BALANCES AND HAIR SPRINGS.

No. 484,797. Patented Oct. 25, 1892.

Witnesses
Chas. J. Williamson,
Henry C. Hazard.

Inventor
George E. Hunter, by
Dindle and Russell his Attys (No Model.) 12 Sheets—Sheet 10.
G. E. HUNTER.
MECHANISM FOR TIMING AND ADJUSTING WATCH BALANCES AND HAIR SPRINGS.
No. 484,797. Patented Oct. 25, 1892.
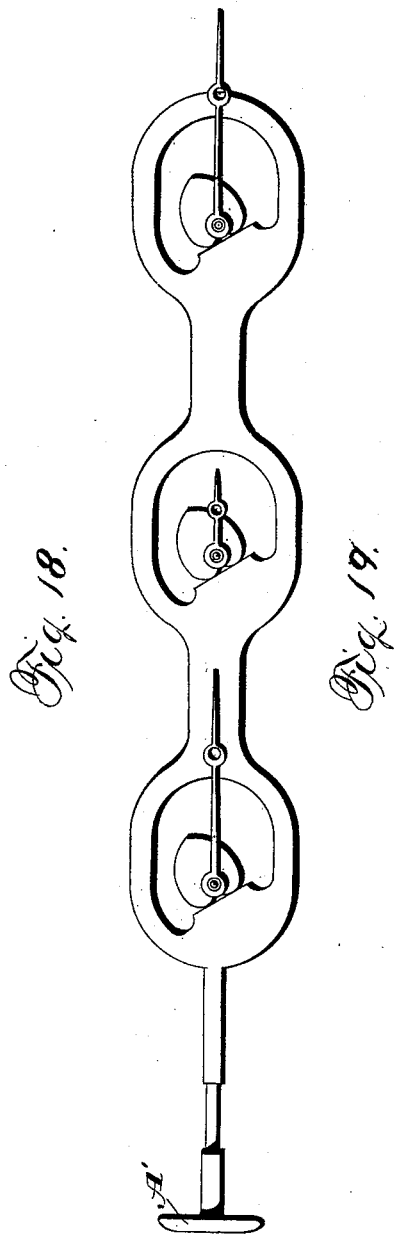
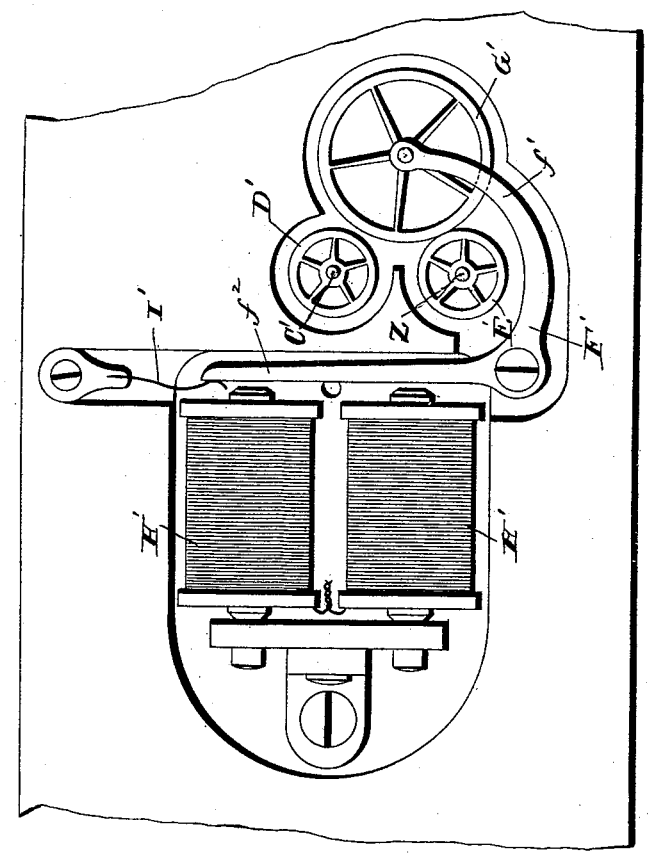
Witnesses
Chas. J. Williamson.
Henry C. Hazard.
Inventor
George E. Hunter, by
Prindle and Russell, his Atty's

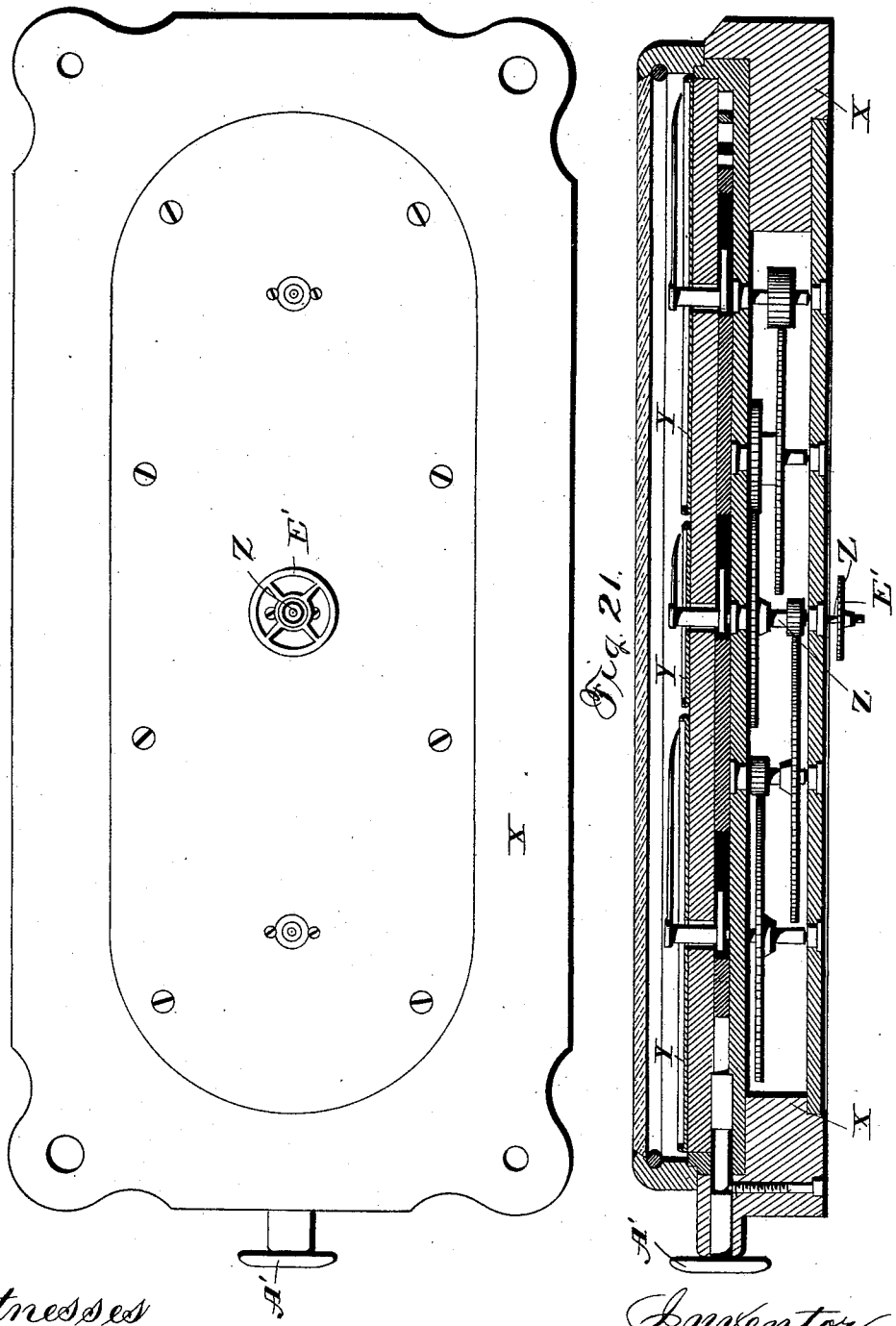

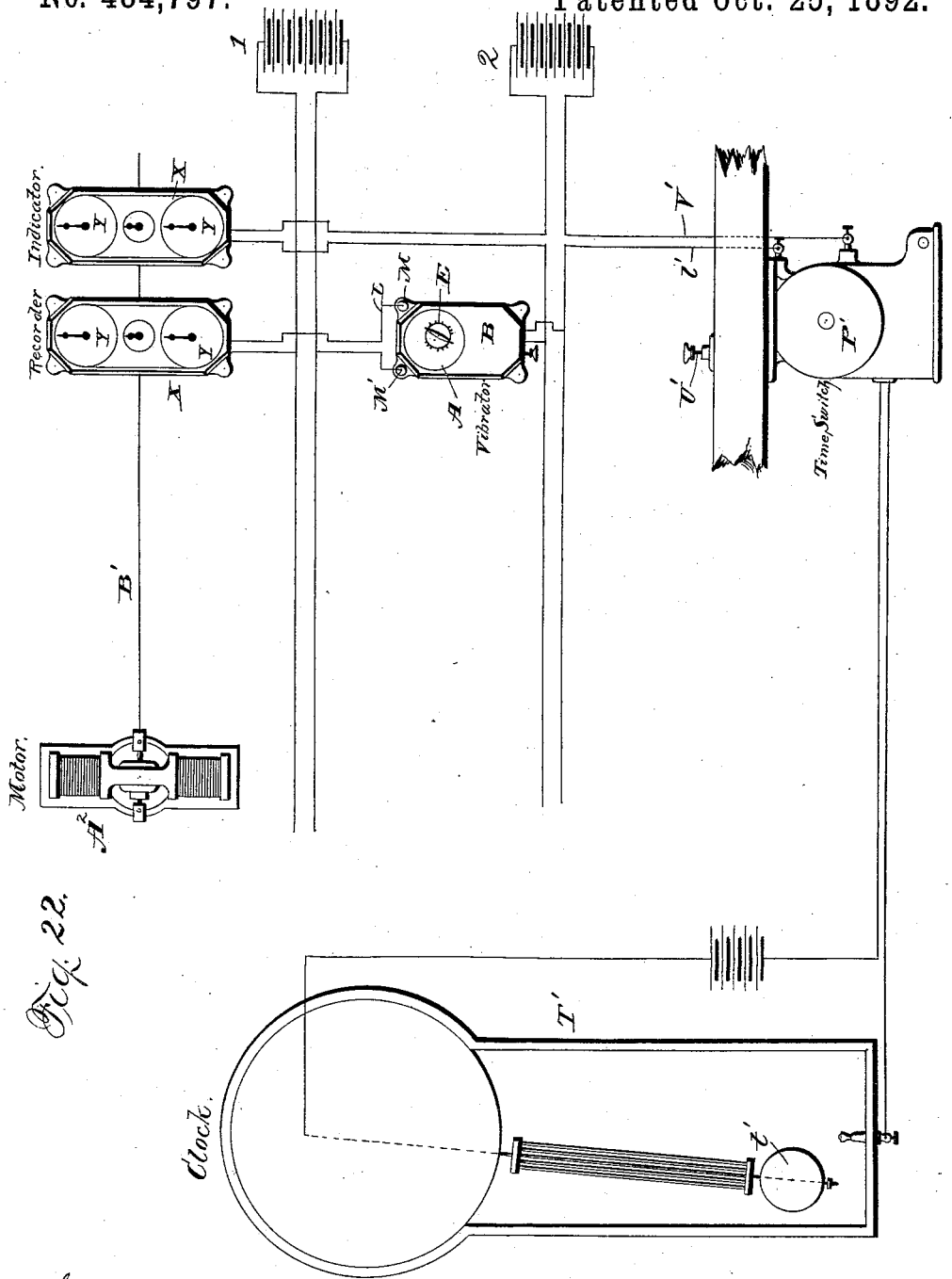

UNITED STATES PATENT OFFICE.

GEORGE E. HUNTER, OF ELGIN, ASSIGNOR TO THE ELGIN NATIONAL WATCH COMPANY, OF CHICAGO, ILLINOIS.

MECHANISM FOR TIMING AND ADJUSTING WATCH-BALANCES AND HAIR-SPRINGS.

SPECIFICATION forming part of Letters Patent No. 484,797, dated October 25, 1892.

Application filed January 26, 1892. Serial No. 419,272. (No model.)

*To all whom it may concern:*

Be it known that I, GEORGE E. HUNTER, a citizen of the United States, residing at Elgin, in the county of Kane, and in the State of Illinois, have invented certain new and useful Improvements in Mechanism for Timing and Adjusting to Temperature Watch-Balances and Hair-Springs; and I do hereby declare that the following is a full, clear, and exact description thereof, reference being had to the accompanying drawings, in which—

Figure 1:
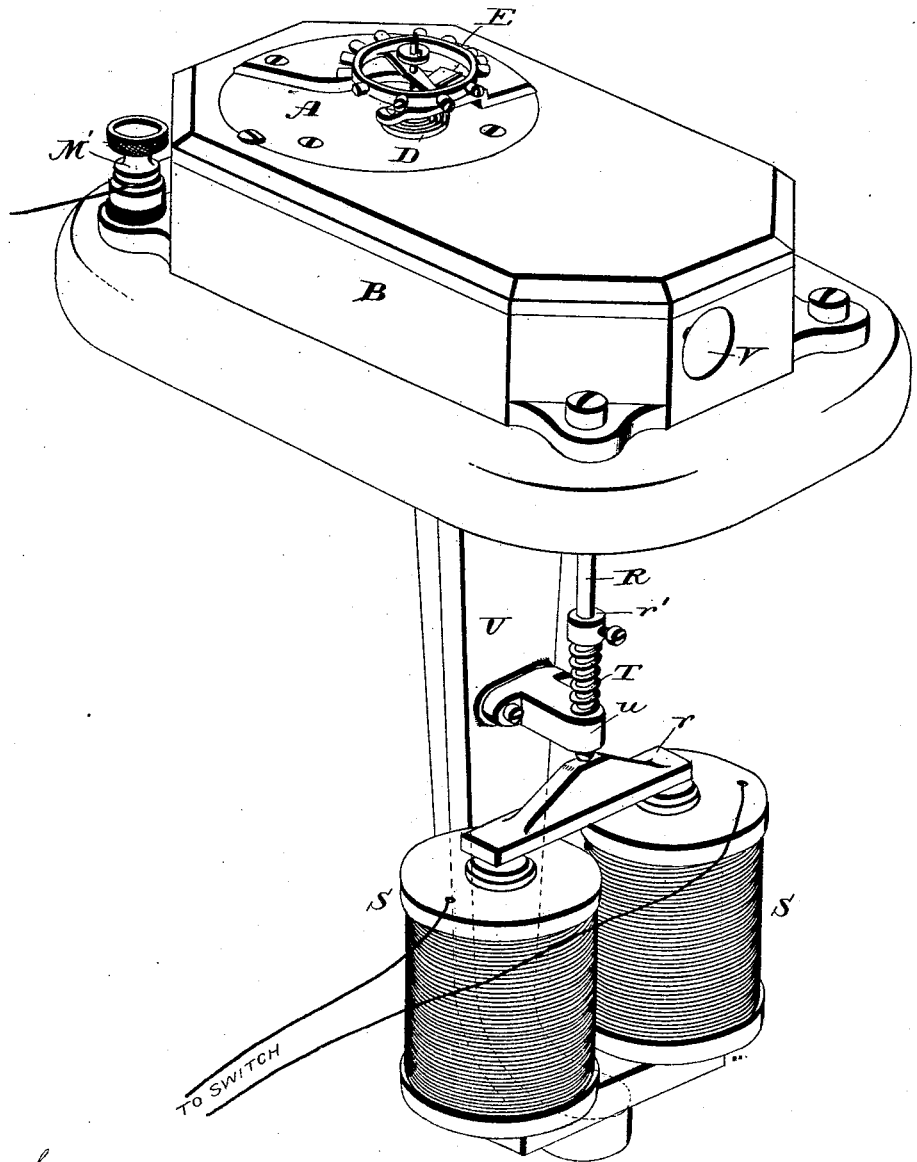
Figure 8:
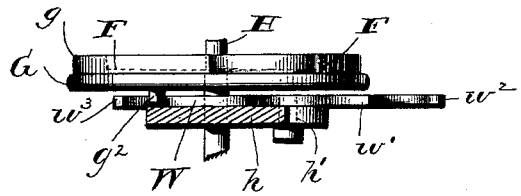
Figure 9:
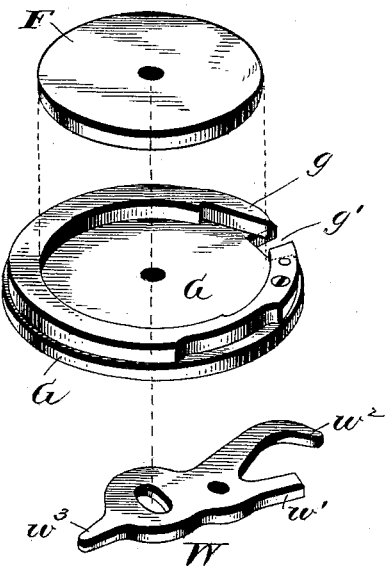
Figure 16:
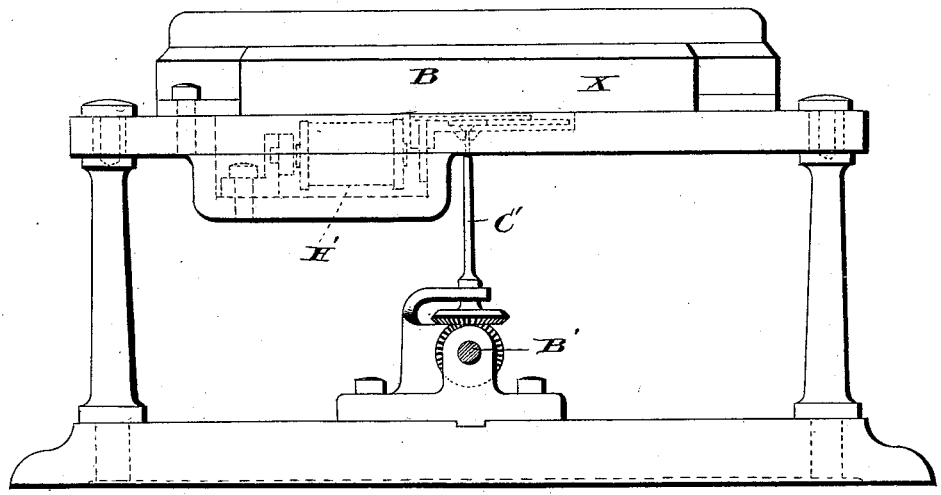
Figure 17:
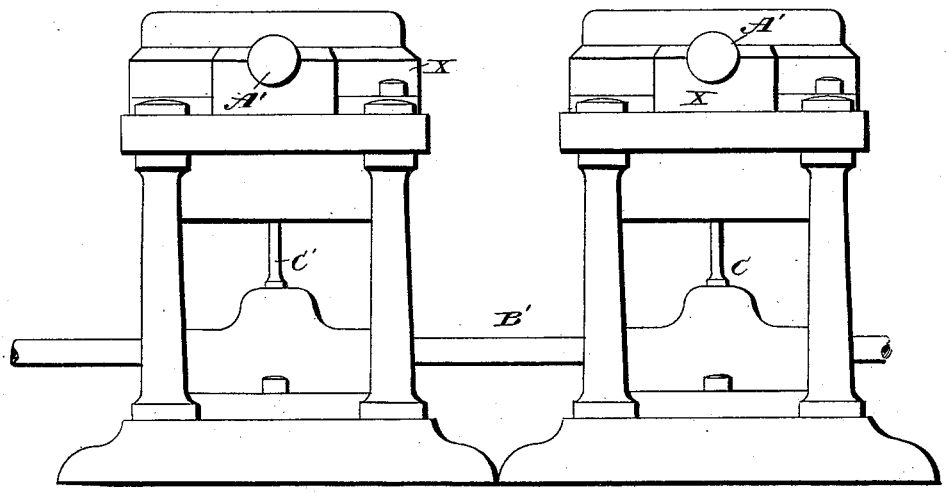

Figure 1 is a perspective view of the vibrator employed. Fig. 2 is a plan view of the same. Fig. 3 is a cross-section of the vibrator upon line $x\ x$ of Fig. 2. Fig. 4 is a central longitudinal section, some of the parts being shown in side elevation. Fig. 5 is a like view of the casing of said vibrator and shows in side elevation the electrically-operated levers employed for releasing the vibrating train. Fig. 6 is a plan view of the upper side of the same. Fig. 7 is a like view of the disk and clutch which operate directly to arrest and release the vibrating train; Fig. 8, a view in side elevation thereof; Fig. 9, a perspective view of said parts separated. Fig. 10 is a front elevation of the armature employed for actuating the said releasing mechanism. Fig. 11 is a perspective view of the mechanism of the time-switch, the casing being broken away to show the arrangement of parts. Fig. 12 is a rear elevation of the same, the casing being in section. Fig. 13 is a section of said switch upon line $x\ x$ of Fig. 10. Fig. 14 is a like view of the same upon line $x'\ x'$ of Fig. 10. Fig. 15 is a plan view of the indicator and recorder and their connecting mechanism. Figs. 16 and 17 are respectively side and end elevations of the same. Fig. 18 is an enlarged plan view of the mechanism employed for setting the hands to zero. Fig. 19 is a like view of the mechanism for connecting the recording and indicating mechanism with the actuating device. Fig. 20 is a plan view of the lower side of the recorder and indicator. Fig. 21 is a section of the same upon line $x^2\ x^2$ of Fig. 13, and Fig. 22 is a plan view of the various parts of my mechanism and shows their relation to each other when arranged for use.

Letters and numerals of like name and kind refer to like parts in the several figures.

The object of my invention is to enable watch-balances and hair-springs to be timed and adjusted to temperature before being placed in movements; and to such end my said invention consists principally in the mechanism employed for controlling and defining the action of the vibrating, recording, and indicating mechanisms, substantially as and for the purpose hereinafter specified.

It consists, further, in details of construction, substantially as and for the purpose hereinafter shown.

In the carrying of my invention into practice each balance or hair-spring is vibrated a predetermined number of times within or in connection with a device that corresponds to the time-train for which it is intended. Such vibrating device (which I term a "vibrator") is operated in conjunction with two registering devices, one of which is designed to act for a predetermined interval of time under control of an accurate timepiece, while the other is designed to act in unison with and have the time of its operation controlled by the vibrator. The two registers are precisely alike in construction and are actuated from the same motor, so that both may be driven at the same speed. Their operation and that of the vibrator is commenced simultaneously; but the register controlled by the clock is stopped at the expiration of a predetermined interval of time—say one minute—while the vibrator and its register are stopped when the spring or balance being tested has made the number of vibrations which a correct spring or balance would make in a minute. If the spring or balance being tested be correct, the two registers will stop simultaneously and the number of registrations made by the two registers will be the same, while if the spring or balance be slow or fast the vibrator and its register will accordingly run longer or shorter than the other register and the registrations of the vibrator-controlled register will be in excess of or less than those of the timepiece-controlled register. It will be seen from this that the character of the spring or balance, and, if the same be inaccurate, the extent of its inaccuracy may be ascertained by a comparison of the registrations of the two registers.

In Fig. 22 of the drawings I show in the form of a diagram the various mechanisms above referred to and designate them by name, and a reference to the same before entering upon the detailed description of the several mechanisms will conduce to a clear understanding of the invention. It will be seen that the vibrator and its register (which for distinction from the other register is termed a "recorder") are connected by an electric circuit that includes a battery, (designated by the numeral 1,) and which enables the vibrator to control the operation of the recorder, while a second independent circuit, having a battery 2, connects the other register, (termed for distinction an "indicator,") the time-switch, which is in a third circuit with and actuated by the clock, and a magnet, (not shown in the diagram,) whose function is to close the circuit of the vibrator and the recorder, said second circuit enabling the clock, through the intermediary of the time-switch, to control the operation of the indicator.

The vibrator preferably used, as shown in Fig. 1, consists, essentially, of an ordinary time-train A, inclosed within a casing B and adapted to be operated by a spring or a weight in any usual manner. For the testing of balances the usual balance is omitted from the movement and the balance-arbor C provided with a standard hair-spring D and upon or within its projecting end is adapted to receive and hold a balance E, while for testing hair-springs a standard balance is attached to the arbor, the hair-spring is omitted, and provision made for the ready attachment and removal of hair-springs to be tested. The fourth arbor $a$ of the time-train A projects downward below the casing B and upon its end has secured a disk F, while directly below the same and in a line therewith axially is a second larger disk G, which is carried by an independently-journaled arbor H. Said disk G is provided upon its upper face with a ring $g$, that is cut apart at one point and has such diameter of interior as to cause it to encircle said disk F and normally to embrace the periphery of the latter with sufficient force to cause said disk G to rotate with said disk F. The ring $g$ is attached at one end only to its disk G and may be opened when desired, so as to leave the disk F free. Such operation is effected by means of a lever I, which is secured upon a shaft K, that is journaled horizontally and transversely within the casing B, and is provided with an arm $i$, that extends upward and by a movement of said lever in one direction is caused to enter between and to separate the ends of said ring, while by an opposite movement of said lever said arm will be withdrawn and said ring again permitted to close. To facilitate such operation, the disk G is provided with a peripheral notch $g'$ at the point where said ring is divided, which has such size and shape as to permit said arm to be moved inward sufficiently to open said ring. The lever I is provided at one end with a permanent weight $i'$, while upon its opposite portion, which is threaded, is provided a second weight $i^2$, that is adapted to travel over such threaded portion and enables such adjustment of said parts as to cause said arm $i$ to have a normal tendency to engage with said cut ring, so as to arrest the motion of said disk G, but not with sufficient force to cause said ring to open. The shaft K is supported upon or within insulating-bearings and is provided with a collar $k$, that has a binding-screw $k'$, from which a flexible wire L extends to a binding-post M outside of the casing, while secured upon or forming part of the threaded portion of the lever I is a spring $i^3$, that is adapted to impinge upon a contact-screw N, which is provided at each point, being secured to an L-shaped bracket $n$, which is attached to and suitably insulated from said casing. To said bracket $n$ is attached by a binding-screw $n'$ one end of a wire L', whose other end is secured to a binding-post M' outside of the casing. From the binding-posts M and M' wires are run to the battery 1 and magnet-coils in the recorder, as will hereinafter more fully appear.

Pivoted at one end within the end of the casing B, adjacent to the contact-screw N, is a lever O, which has the form shown in Fig. 5 and at its free forked end $o$ has pivoted a finger P, that is provided with a tail-piece $p$, which rests normally upon the upper face of said lever and is held in such position with a yielding force by means of a spring $o'$. From its pivotal connection with said lever said finger extends forward and downward and at its end is adapted to engage with the end of an arm Q, which is secured to and extends rearward from the shaft K.

At or near the longitudinal center of the lever O is pivoted one end of a rod R, which from thence extends downward to and is connected with an armature $r$, which armature is adapted to be acted upon by magnet-coils S and S, that are located beneath the same. A spring T, placed around the rod R and having its ends confined between a collar $r'$ upon the latter and a guide $u$, which projects from the bracket U, that supports said magnet-coils, operates to hold said rod and said lever O with a yielding pressure at the upper limit of their motion, while by the application of a current of electricity to the magnet-coils said parts, through the armature $r$, will be moved to the lower limit of their motion, and during such movement the finger P will engage with the arm Q and give to the shaft K a partial rotation and move the arm $i$ out of engagement with the cut ring $g$. As said arm Q and finger P move downward below their pivotal bearings their ends will move apart, until at a predetermined point the latter slips off from the former and the lever I is permitted to resume its normal position. When the ring $g$ is engaged with the disk F and is unobstructed, it moves with the latter and carries with it the disk G, and when the arm $i$ is permitted to engage with the ends of said cut ring all motion of the time-train is arrested; but by a further inward movement of said arm said cut ring may be opened, so as to release said disk F and permit said time-train to move again. Such release is effected by means of a rod V, which extends longitudinally inward through one end of the casing B, with its inner end adjacent to the upper end of said arm $i$. At its outer end said rod is provided with a push-button and by means of a suitable spring it is held at the outer limit of its motion, as shown, and when moved to the inner limit of its motion by the operator's hand it will engage with and move said arm $i$ into the notch $g'$ of said disk G and spread said cut ring, so as to release the time-train. It will be seen that after a balance has been placed in position an inward movement of the push-rod V will spread the cut ring $g'$ and enable the time-train to start, while by the application of an electric current to coils S and S the lever O will be drawn downward, and, through the finger P and the arm Q, the shaft K will be turned, so as to withdraw the arm $i$ from engagement with said cut ring, when the latter will close and the disk G instantly commence to rotate with the disk F of said time-train. After the withdrawal of the arm $i$ from engagement with the cut ring $g$ it is intended that the latter shall make one entire revolution and that said arm shall then automatically engage with the same and instantly arrest its movement and the motion of the time-train. This operation is effected as follows: Pivoted near the center on a stud or pin $h'$, secured to the cock $h$, which journals the arbor H, is a plate W, which has the form shown in Fig. 7, the portion upon one side of its pivotal bearing being provided with an elongated opening $w$, that spans said shaft and permits the plate to be oscillated upon said bearing the required distance. The opposite end of said plate is forked, and one of its arms $w'$ has such length as to cause its end to project slightly beyond the periphery of the disk G, while the opposite arm $w^2$ extends outward beyond said disk and then curves toward said arm $w'$. When the arm $i$ is moved out of contact with the cut ring $g$, it strikes against the curved arm $w^2$ of the plate or detent W and moves the free end of the latter, so as to cause its arm $w'$ to project partly across the notch $g'$ of the disk G, so that when said arm is permitted to be moved inward again by the weight $i'$ it will impinge upon and be supported by said arm $w'$. After the movement of said disk has caused the cut portion of said ring $g$ to pass beyond said arm $i$ a pin $g^2$, secured within and projecting downward from said disk, engages with a tail-piece $w^3$ upon said plate and swings the latter in an opposite direction until said arm $w'$ passes out of engagement with the arm $i$, which arm then moves inward until it rests upon the periphery of said disk, where it remains until the further rotation of the latter brings the cut portion of said ring into position to permit said lever-arm to move inward into engagement therewith, and thereby instantly arrest the motion of the time-train.

As hereinbefore stated, in connection with the vibrator described I employ a standard clock and two registering mechanisms, which for the purpose of distinguishing I call, respectively, a "recorder" and an "indicator." These registering mechanisms are driven at a uniform velocity by any suitable motor and are adapted to be readily connected with and disconnected from such motor. The recorder is controlled by the vibrator and is intended to run as long as the balance requires to make the number of vibrations representing one minute of correct time, while the indicator is controlled by the clock and when set in motion is intended to run precisely one minute. The vibrator, recorder, and indicator being simultaneously started, the time in excess of or less than one minute which is necessary for producing the representative vibrations will show how much said balance is slow or fast.

The recorder and indicator have, preferably, the same construction, and consist, essentially, of a casing X, having suitable registering mechanism that is adapted to show upon a dial Y or upon dials Y and Y the number of revolutions of a driving-arbor Z. Said registering mechanism is provided with the usual means for setting the hands or other indicating devices at "0" before each trial. For such purpose I preferably employ heart-shaped cams and a bar, which is operated by a push-button A', as shown in Fig. 16.

For driving the registering mechanisms I show an electric motor A², which is secured upon or connected with a shaft B', that extends transversely beneath the recorder and indicator, as shown. From such shaft there is driven a vertically-arranged arbor C', which at its upper end is provided with a finely-toothed wheel D', that occupies the same plane as and is near to a similar wheel E', which is secured upon the lower end of the arbor Z. Pivoted at the intersection of its arms is an L-shaped bar F', which has journaled upon the end of one of its arms $f'$ a toothed wheel G', which has, preferably, about twice the diameter of the wheels D' and E' and by a movement of said bar upon its pivotal bearing may be caused to engage with and connect said wheels, so as to cause a rotation of one to be communicated to the other, while by an opposite movement of said bar upon its pivotal bearing said intermediate wheel will be moved out of such engagement. The opposite arm $f^2$ of said bar forms or is attached to an armature, which by the action of magnet-coils H' and H' may be moved so as to cause engagement between said wheels D', E', and G', while a spring I', engaging with the end of said arm $f^2$, operates to hold said parts normally out of engagement. It is to be understood that the indicator and recorder are provided with the just-described mechanism.

The mechanism employed for connecting the clock with the indicator is shown in Figs. 9 to 12, and is constructed as follows, viz: Secured upon a horizontally-journaled hollow shaft J' is a disk K', that at one point of its periphery has inserted a piece of insulating material $k^2$ and has constant engagement of periphery with an electric contact-spring $L^2$. Upon said shaft is also secured a toothed wheel M', which has sixty teeth and is engaged by a like wheel N', that is attached to and adapted to rotate with a ratchet-wheel O', which is provided with sixty-two peripheral teeth o'. The disk and other parts described are inclosed by a casing P', which has the form shown, and in the lower portion of the same are placed two magnet-coils Q' and Q', and beneath the same is an armature R', which is pivoted at one end to said casing and by means of an intermittent current of electricity passing through said coils may have a vertically-reciprocatory motion produced in its free end. To said free end is secured a bar S', which from thence extends upward beside the ratchet-wheel O' and at its upper end s' is adapted to engage with the teeth o' at each upward movement of said armature. A spring $s^2$, bearing against the outer side of said bar or pawl, operates to hold the same in normal contact with said ratchet-teeth, so as to insure the engagement of said parts whenever said armature moves upward, while permitting its engaging end to trip over said teeth when said armature and ratchet bar or pawl move downward, the arrangement of parts causing the disk K' to be given a step-by-step rotation whenever an intermittent or interrupted electric current is applied to the magnet-coils. Such result is secured by connecting said coils electrically with an accurate clock T', so that each beat of its pendulum t' sends through them an electric impulse that gives motion to said armature and causes through the same and the connected mechanism a partial rotation of said disk K'. The disk K' is intended to make nearly a complete revolution and then automatically stop. This is effected by means of a pin $k^3$, which projects from one of the faces of said disk near its periphery and is adapted to engage with an arm $s^3$, that projects upward and inward from the pawl S', and by such engagement to press the latter outward until it no longer engages with the teeth of the ratchet-wheel O'. At the instant when such disengagement of said pawl is effected the contact-spring L' engages with the insulating-piece $k^2$ for purposes hereinafter described. To relieve the disk from such stoppage, I employ a rod U', which projects downward through the casing P' and is supported by means of a spring u', with its lower end just above said pin $k^3$, after the latter has moved said pawl out of engagement with said ratchet-wheel and is adapted to have a limited longitudinal motion. A downward pressure upon the upper end of said rod will cause its lower end to engage with said pin and to move the same downward until out of engagement with the pawl-arm $s^3$, when said pawl will again engage with said ratchet-wheel and give to the same the step-by-step motion. The contact-spring L' is connected by a wire l' with magnet-coils of the indicator, while a second wire V' connects said indicator and the vibrator with a contact-spring W', that is arranged to bear against one side of the disk K'.

The mechanism thus combined is used as follows, viz: The operator, having set the recording and indicating devices at "0," places a balance in position within the vibrator and by an inward pressure upon the rod V releases the time-train and permits it to run. After said balance has attained its maximum arc of vibration the operator pushes down upon the rod U', so as to cause the ratchet-wheel O' to be engaged by the pawl S', and by such movement turns the disk K' until the insulating-piece k' has passed the contact-spring L', which closes the circuit through the magnet-coils S and S of the vibrator and the magnet-coils H' and H' of the indicator and causes the time-train of the former and indicating mechanism of the latter to move. Such circuit includes the battery 2, the wire V' running from one pole thereof to the contact W', said contact, the disk K', the contact $L^2$, the wire l', leading to the coils S and S, said coils, a wire from these to the coils H' and H' of the indicator, the said coils H' and H', and a wire from these to the other pole of the battery. The retraction of the lever-arm i from engagement with the cut ring g of the vibrator produces contact between the spring $i^3$ and screw N, and, closing the circuit through the magnet-coils H' and H' of the recorder, causes the mechanism of the latter to be set in motion. This circuit includes the battery 1, a wire from one pole thereof to the coils H' and H' of the recorder, said coils, a wire from these to the binding-post M, the wire L, the shaft K, the lever I, its spring $i^3$, the contact-screw N, the bracket n, the wire l' from the latter to the binding-post M', and a wire from said post to the other pole of said battery. When the clock has beat sixty times, the rotation of the disk K' has brought the insulating-piece k' beneath the contact-spring L', and, breaking the circuit, releases the armature r of the vibrator, so as to permit the lever O to return to its upper normal position, and at the same time releases the armature $f^2$ of the indicator, so as to cause the indicating mechanism to instantly stop. When the balance has vibrated the predetermined number of times, whether before, at, or after the expiration of sixty seconds, the movement of the locking-arm i causes the contact-spring $i^3$ and screw to separate and by thus breaking the circuit effect the instant stoppage of the recorder mechanism.

Although shown and described, the clock and the time-switch in themselves are not absolutely necessary to be used. Any mechanism that will start the indicator, vibrator, and recorder in unison and stop the former at the expiration of any predetermined interval of time and the latter when the balance under examination has completed the number of beats due that interval will be equally effective. The time-switch is more particularly useful as a convenient means for operating a number of vibrators and recorders by or in connection with one clock. This mechanism may also be employed for the compensation of balances, for which purpose it will only be necessary that the vibrator be run in extremes of temperature and the errors noted and corrected in the usual manner. The method disclosed is not claimed herein, but forms the subject-matter of a separate application filed on an even date herewith and having the Serial No. 419,271.

Having thus described my invention, what I claim is—

1. In combination with means for vibrating a balance or hair-spring, an indicating or registering device having a definite relation to said balance or spring and a second indicating or registering device controlled by a standard timepiece, substantially as and for the purpose shown.

2. In combination with two registering devices having a predetermined relation, mechanism for vibrating a balance or hair-spring a predetermined number of times, means for stopping the latter and one of said registering devices simultaneously, and means for stopping the other registering device at the expiration of a predetermined interval of time having relation to the number of vibrations given the balance or hair-spring, substantially as and for the purpose specified.

3. In combination with two registering devices, means to operate them at the same speed, mechanism connected with one of such registering devices for vibrating a balance or hair-spring a predetermined number of times, means for simultaneously stopping said vibrating and registering devices, and means for stopping the other registering device at the expiration of a predetermined interval of time having a relation to the number of vibrations given the balance or hair-spring, substantially as and for the purpose shown.

4. In combination with two registers, means for simultaneously operating them at the same speed, means for vibrating a balance or hair-spring a predetermined number of times connected with one of said registers, a standard timepiece connected with the other register, means for simultaneously stopping said vibrator and its register on the completion of the predetermined number of vibrations of the balance or hair-spring, and means for stopping the other register at the expiration of a predetermined interval of time having a relation to said vibrations as determined by the timepiece, substantially as and for the purpose set forth.

5. In combination with two registers, means for operating them at the same speed, means for vibrating a balance or hair-spring a predetermined number of times, which is adapted to control the time of operation of one of such registers, and a standard timepiece electrically connected with the other register and adapted to control the time of operation of the same, substantially as and for the purpose shown and described.

6. In combination with two registers, a balance or hair-spring vibrator in an electric circuit with one of such registers and a switch which is in a circuit which enables it to control both registers and said vibrator and operating by closing such circuit to simultaneously start all three and by breaking the circuit to cause them to stop, substantially as and for the purpose specified.

7. In combination with two registers, a balance or hair-spring vibrator, a time mechanism, and electric connections between said parts whereby said time mechanism may control the period of operation of one register and said vibrator the period of operation of the other register, substantially as and for the purpose shown.

8. In combination with two registers, a balance or hair-spring vibrator in electric circuit with one of the same and provided with a make-and-break device, a time mechanism in circuit with the other of said registers and said vibrator, means to simultaneously throw said vibrator, its register, and the other register in circuit, means for breaking the circuit between the vibrator and its register to simultaneously stop their operation, and means for breaking the circuit between said time mechanism and the other register, substantially as and for the purpose set forth.

9. In combination with two registers, a balance or hair-spring vibrator adapted for simultaneous operation with one of the registers, a time mechanism in electric circuit with such vibrator and the other register, a switch to simultaneously close said circuit between the time mechanism, its register, and the vibrator and to simultaneously break the same, and means for simultaneously stopping the vibrator and the register in connection therewith, substantially as and for the purpose shown and described.

10. In combination with two registers, a balance or hair-spring vibrator, an electric circuit provided with a circuit-breaker connecting such vibrator and one of said registers to enable them to operate in unison, a magnet to operate the circuit-breaker, a time mechanism in circuit with said magnet and the other register, and a switch in such circuit to simultaneously operate said circuit-breaker through said magnet and start said second register, substantially as and for the purpose specified.

11. In combination with two registers, a balance or hair-spring vibrator, an electric circuit connecting the latter and one of such registers to enable them to operate in unison and having in it a circuit-breaker, a magnet to operate the latter, a time-switch in circuit with said magnet and the other register, and a timepiece to actuate such switch a predetermined length of time to control the operation of the said other register, substantially as and for the purpose shown.

12. In combination with a balance or hair-spring vibrator, a part to be driven by the same to determine the period of its operation and means for simultaneously connecting said part with the vibrator and starting a register and for simultaneously disconnecting said parts and stopping said register, substantially as and for the purpose set forth.

13. In combination with a mechanism for vibrating a balance or hair-spring, a part to be operated thereby to determine the period of its operation, a register in electric circuit with such vibrating mechanism, and means for closing such circuit to start said register and simultaneously connect the vibrating mechanism with said controlling part and to stop such register and disconnect the latter and the vibrating mechanism, substantially as and for the purpose shown and described.

14. In combination with the registering mechanism of a balance and hair-spring testing apparatus, a watch-movement for vibrating a balance or hair-spring, a rotary disk or piece, and means for connecting the latter with such movement and for separating them after a predetermined number of revolutions of the disk, substantially as and for the purpose specified.

15. In combination with a watch-movement for vibrating a balance or hair-spring, a notched disk or piece, a clutch to connect the latter to said movement, a vibratory lever to co-operate with said disk and clutch, and means for operating the same, substantially as and for the purpose shown.

16. In combination with a watch-movement for vibrating a balance or hair-spring, a notched disk, a clutch for connecting such disk with the movement, a register in electric circuit with the vibrator, and a vibratory lever to co-operate with said notched disk and the clutch and to close and open said circuit, substantially as and for the purpose set forth.

17. In combination with a watch-movement for vibrating a balance or hair-spring, a disk provided with a notch and adapted to be connected with such movement, an arm adapted to be moved into and out of such notch, a stop device for preventing said arm from returning to said notch immediately after its removal, and means for simultaneously starting and stopping a register upon the removal and return, respectively, of said arm, substantially as and for the purpose shown and described.

18. In combination with a watch-movement, a disk provided with a notch and adapted to be connected with such movement, an arm adapted to be moved into and out of such notch, a pivoted plate adapted to be engaged by such arm on its outward movement and to be projected across said notch, and a pin upon said disk to engage said plate and remove it from said notch, substantially as and for the purpose specified.

19. In combination with a watch-movement, a disk carried by one of its arbors, a second notched disk arranged below and in line axially with the other, a split spring-ring carried by the lower disk in position to embrace the periphery of said upper disk with its split portion opposite the notch thereof, and a pivoted arm adapted to be moved into and out of said notch to open said split ring, and thereby free the upper disk, and to cause the latter to be clamped, and thereby rotate said notched disk, substantially as and for the purpose shown.

20. In combination with a register, a watch-movement in an electric circuit therewith, a disk provided with a notch and adapted to be engaged with and driven by said movement, an arm made movable into and out of said notch and adapted to open and close the circuit, a push-rod adapted to move such arm into said notch to effect the disengagement of said disk and movement and to open said circuit, and means for withdrawing said arm, so as to re-engage said disk and movement and to close said circuit simultaneously with the starting of a second register, substantially as and for the purpose shown and described.

21. In combination with a register, a watch-movement in an electric circuit therewith, a disk provided with a notch and adapted to be connected with and driven by said movement, an arm made movable into and out of such notch and adapted to open and close the electric circuit, a push-rod to move said arm into said notch to effect the disengagement of said disk and movement and to open said circuit, and a second electric circuit, including a magnet to withdraw said arm from the notch in the disk, a second register, and a switch which is adapted to simultaneously effect the connection of the notched disk with the watch-movement, the closing of the circuit between the latter and its register, and the closing of its own circuit, which includes the second register, substantially as and for the purpose specified.

22. In combination with a rotary circuit closing and opening disk or part, the magnet-operated devices to rotate the same, adapted to be actuated by a timepiece in circuit with the magnet, said circuit being independent of the one controlled by said disk, substantially as and for the purpose shown.

23. In combination with a rotatable disk which is adapted to close and open a circuit, a ratchet-wheel for revolving such disk, a pawl to actuate the ratchet-wheel, and means to disengage the pawl and ratchet-wheel to render the latter inoperative to move the disk at a certain point in the revolution of the latter, substantially as and for the purpose specified.

24. In combination with a rotatable disk which is adapted to close and open a circuit, a ratchet-wheel and pawl to revolve said disk and a pin or projection carried by the disk to disengage the pawl from its wheel at a certain point in its revolution, substantially as and for the purpose shown.

25. In combination with a rotatable disk forming part of an electric circuit and having in its periphery an insulator, a contact-piece resting on said periphery and adapted at each revolution of the disk to have contact with said insulator, a ratchet-wheel connected with said disk to rotate the same, a pawl to actuate the ratchet-wheel, means to operate the pawl, a pin or projection on the disk to engage the latter to prevent it from actuating the ratchet-wheel, and suitable means to release the pawl from engagement by said pin, substantially as and for the purpose set forth.

26. In combination with a device for vibrating a balance or hair-spring, two registers simultaneously operated by the same motor and having independent stopping mechanisms, substantially as and for the purpose shown and described.

27. In combination with means for vibrating a balance or hair-spring, two registers, a shaft connected with both registers and adapted to simultaneously operate them at the same rate of speed, and means for stopping said registers independently of each other, substantially as and for the purpose specified.

In testimony that I claim the foregoing I have hereunto set my hand this 19th day of November, 1891.

GEORGE E. HUNTER.

Witnesses:
GEO. S. PRINDLE,
CARLOS H. SMITH.